US011393056B1

(12) United States Patent
Spickes et al.

(10) Patent No.: US 11,393,056 B1
(45) Date of Patent: Jul. 19, 2022

(54) PROPERTY TOUR MANAGEMENT SYSTEM

(71) Applicant: TourZazz, Inc., Austin, TX (US)

(72) Inventors: Michael Jonathan Spickes, Austin, TX (US); Stacy Lynette Cunningham-Spickes, Austin, TX (US)

(73) Assignee: TourZazz, Inc., Austin, TX (US)

( * ) Notice: Subject to any disclaimer, the term of this patent is extended or adjusted under 35 U.S.C. 154(b) by 590 days.

(21) Appl. No.: 16/292,302

(22) Filed: Mar. 4, 2019

Related U.S. Application Data

(60) Provisional application No. 62/639,480, filed on Mar. 6, 2018.

(51) Int. Cl.
| | |
|---|---|
| G06Q 50/16 | (2012.01) |
| G06F 16/909 | (2019.01) |
| G06F 16/9038 | (2019.01) |
| G06F 16/9035 | (2019.01) |
| G06Q 10/02 | (2012.01) |
| G01C 21/34 | (2006.01) |
| G06Q 10/04 | (2012.01) |
| G06N 20/10 | (2019.01) |

(52) U.S. Cl.
CPC ....... *G06Q 50/163* (2013.01); *G01C 21/3415* (2013.01); *G06F 16/909* (2019.01); *G06F 16/9035* (2019.01); *G06F 16/9038* (2019.01); *G06Q 10/025* (2013.01); *G06Q 10/04* (2013.01); *G06Q 10/047* (2013.01); *G06N 20/10* (2019.01)

(58) Field of Classification Search
CPC .. G06Q 50/163; G06Q 10/047; G06Q 10/025; G06Q 10/04; G01C 21/3415; G06F 16/9035; G06F 16/9038; G06F 16/909; G06N 20/10
See application file for complete search history.

(56) References Cited

U.S. PATENT DOCUMENTS

| | | | | |
|---|---|---|---|---|
| 8,000,727 | B1 * | 8/2011 | Bushman | H04L 63/18 455/456.5 |
| 9,954,835 | B2 * | 4/2018 | Brown | G07C 9/00896 |
| 9,978,109 | B1 * | 5/2018 | Catalano | G06Q 50/16 |
| 2003/0204406 | A1 * | 10/2003 | Reardon | G06Q 40/025 705/313 |
| 2004/0030631 | A1 * | 2/2004 | Brown | G06Q 40/04 705/37 |

(Continued)

OTHER PUBLICATIONS

Wiggers, 'These 10Apps Make Searching for a Home a Cinch',Jun. 16, 2017, <https://www.digitaltrends.com/mobile/best-real-estate-apps/> (<http://web.archive.org/web/20170618143845/https://www.digitaltrends.com/mobile/best-real-estate-apps/> captured on Jun. 18, 2017 using Wayback Machine) (Year: 2017).*

*Primary Examiner* — Michael P Harrington
*Assistant Examiner* — Brian A Tallman
(74) *Attorney, Agent, or Firm* — Amsel IP Law PLLC; Jason Amsel

(57) ABSTRACT

A property tour management system automatically manages creation, real-time facilitation, and analytics associated with property tours. The system includes various portals to provide access to information and performance of functions useful to agents, buyers, and real-estate organizations relating to a property tour experience. The system enables all parties involved to gain a more efficient, more informational, and more enjoyable property tour experience.

17 Claims, 11 Drawing Sheets

(56) References Cited

U.S. PATENT DOCUMENTS

| | | | | |
|---|---|---|---|---|
| 2004/0049406 | A1* | 3/2004 | Muncaster | G09F 9/00 |
| | | | | 705/313 |
| 2007/0168211 | A1* | 7/2007 | Arnebeck | G06Q 10/109 |
| | | | | 705/313 |
| 2009/0153291 | A1* | 6/2009 | Larson | G07C 9/00896 |
| | | | | 340/5.33 |
| 2009/0254269 | A1* | 10/2009 | Borrillo | H04W 4/02 |
| | | | | 701/533 |
| 2012/0290203 | A1* | 11/2012 | King | G01C 21/343 |
| | | | | 701/430 |
| 2014/0100905 | A1* | 4/2014 | Alexander | G06Q 30/0613 |
| | | | | 705/7.19 |
| 2015/0186805 | A1* | 7/2015 | Florance | G06Q 10/06 |
| | | | | 705/313 |
| 2016/0180621 | A1* | 6/2016 | Desinor, Jr. | G07C 9/00896 |
| | | | | 340/5.61 |
| 2016/0307242 | A1* | 10/2016 | Kuhlmann | G06Q 30/0278 |
| 2018/0060980 | A1* | 3/2018 | Stachowski | G06Q 10/0631 |

\* cited by examiner

FIG. 8

Home   Solutions   How It Works   Buy Now   Agent Login

Agent Dashboard | FAQs | Log Out

Property Tour Setup
Contact: Brian and Amanda Smith      Tour Date: November 1, 2016

| Select Properties | Create Schedule | Custom Locations | Welcome Video | Tour Complete |

You can track distance and walkscore information from each property on the tour to one or multiple locations. Use the search bar below to search for and add locations. Your clients will also have the ability to modify, add or delete locations in their property tour interface.

[Search by restaurant, shopping mall, school, hospital, etc]   [Search]   [Add Location]

Client Custom Locations

Location 1  Motorola
            123 Street, Austin, Texas 78757
Nickname    [Daddy's Work]
            Edit Address | Delete Location Location 2  Eanes Elementary
            456 Street, Austin, Texas 78746
Nickname    [Sarabeth's school]
            Edit Address | Delete Location Location 1  Yoga Studio
            789 Street, Austin, Texas 78746
Nickname    [Jan's Yoga Workout]
            Edit Address | Delete Location

PROPERTY TOUR MANAGEMENT SYSTEM

RELATED APPLICATIONS

This application claims the benefit of U.S. Provisional Application No. 62/639,480 filed on Mar. 6, 2018, which is incorporated by reference herein.

BACKGROUND

1. Field of Art

The disclosure generally relates to a property tour management system, and more particularly to intelligently generating and facilitating property tour itineraries.

2. Description of the Related Art

Conventional real estate applications enable prospective buyers to conduct online searches for properties and view various information about the properties. These applications are useful for information gathering but do little to assist prospective buyers or their agents in other aspects of the property buying experience.

SUMMARY

A method, system, and non-transitory computer readable storage medium generates a property tour itinerary. A plurality of property identifiers for a plurality of properties and constraints associated with the property tour itinerary are obtained. A property database is queried to obtain property information associated with the plurality property identifiers. Tour times are computed for each of the plurality of properties based on the property information. A maps database is queried to determine estimated drive times between properties based on the property information. A property tour itinerary is generated based on at least the tour times the drive times, and the constraints. A representation of the property tour itinerary is presented to a user interface of a client device.

In an embodiment, computing the tour times comprises generating a first feature vector representing characteristics of a given property based on the property information, generating a second feature vector representing characteristics of a prospective buyer based on a buyer profile, and applying a machine-learned model to the first and second feature vectors to generate a predicted tour time associated with the given property.

In an embodiment, computing the tour times further comprises tracking an actual tour time for the given property, and updating the machine-learned model based on the tracked actual tour time.

In an embodiment, generating the property tour itinerary comprises determining tour order for the plurality of properties that meets the constraints and an optimization criterion, and generating start times for each of the plurality of properties based on a desired tour start time, the determined tour order, and the tour times.

In an embodiment, generating the property tour itinerary comprises identifying accounts associated with the properties based on the property information, automatically transmitting availability request messages to the accounts associated with the properties requesting availability information associated with the property tour itinerary, receiving responses to the availability request messages, updating the constraints to generate updated constraints specifying the unavailability responsive to at least one of the responses indicating unavailability of a given property at a scheduled time specified by the property tour itinerary, and re-generating the property tour itinerary based on the updated constraints.

In an embodiment, a property tour management system furthermore tracks a location of a client device associated with the property tour itinerary during a scheduled time of the property tour itinerary, detects at least a threshold time difference between a scheduled time associated with a tour of a given property in the property tour itinerary and an actual time, updates constraints associated with the property tour itinerary to reflect the detected time difference, and re-generates the property tour itinerary based on the updated constraints.

In an embodiment, the property tour management system furthermore causes a client device to operate in a tour mode, detecting a start time associated with a tour of a given property in the property tour itinerary when operating in the tour mode, obtaining credentials for accessing a smart device in the given property based on the property information, providing the credentials to the smart device via an application programming interface for the smart device, causing presentation of controls for controlling the smart device via a user interface of the client device, and controlling the smart device in response to detecting selection of the controls.

In an embodiment, the credentials are configured to expire following an end time associated with the tour of the given property.

In an embodiment, the property tour management system furthermore obtains category weights for a plurality of scoring categories, obtains, for each of the plurality of properties, a set of category scores in each of the plurality of scoring categories, combines, for each of the plurality of properties, the set of category scores with the respective category weights to generate property scores, ranks the plurality of properties according to the property scores, and stores an association between the property scores and the plurality of properties in the property tour itinerary.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 8 illustrates an example of an interface for generating a property tour itinerary according to one embodiment.

FIG. 9 illustrates an example embodiment of an interface for selecting points of interest to be associated with a property tour itinerary according to one embodiment.

FIG. 11 illustrates an interface for presenting a set of properties associated with a property tour according to one embodiment.

DETAILED DESCRIPTION

The Figures (FIGS.) and the following description relate to various embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A property tour management system automatically manages creation, real-time facilitation, and analytics associated with property tours. The system includes various portals to provide access to information and performance of functions useful to agents, buyers, and real-estate organizations relating to a property tour experience. The system enables all parties involved to gain a more efficient, more informational, and more enjoyable property tour experience.

Figure 1:
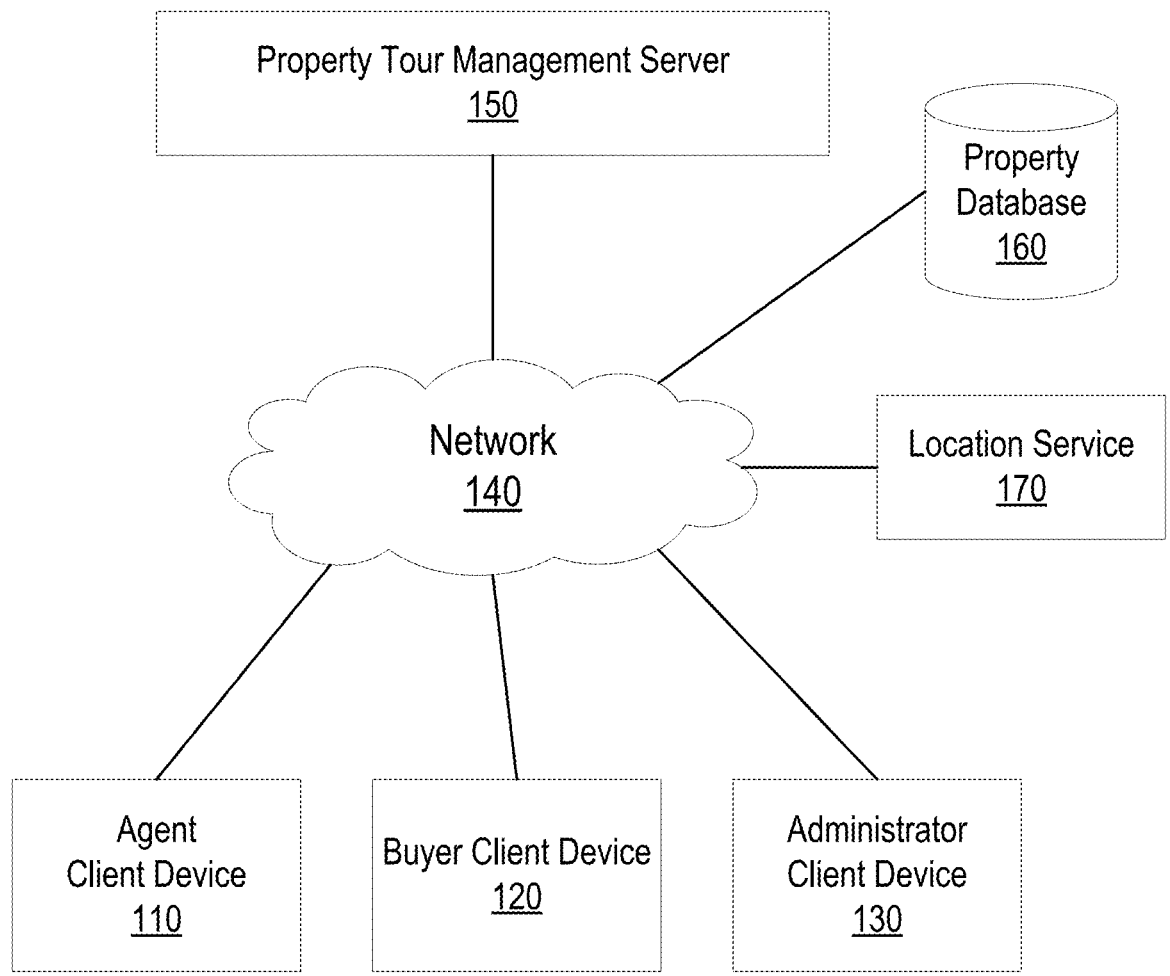
FIG. 1 illustrates a property tour management system for facilitating property tours, according to one embodiment.

FIG. 1 illustrates an embodiment of a property tour management system 100 for facilitating management of a property tour experience, according to one embodiment. The property tour management system 100 includes a network 140, a property tour management server 150, a property database 160, a location service 170, and a plurality of client devices including an agent client device 110, a buyer client device 120, and an enterprise administrator client device 130. Other embodiments may include additional or different components.

The network 140 enables communications among the entities connected to it through one or more local-area networks and/or wide-area networks. In one embodiment, the network 140 includes the Internet and uses standard wired and/or wireless communications technologies and/or protocols or may use custom and/or dedicated data communications technologies instead of, or in addition to, the ones described above.

The property tour management server 150 comprises a computing device for facilitating management of a property tour. The property tour management server 150 may host a website accessible by a browser executing on the clients 110, 120, 130 and may host an application server hosting content accessible by applications executing on the clients 110, 120, 130. The property tour management server 150 may furthermore perform backend processing to facilitate tasks such as generating recommendations of properties that may be of interest to a buyer, facilitating scoring of property based on feedback from a buyer or agent, generating itineraries for property tours, tracking various analytical data relating to activities of buyer and agents, and storing various information relating to buyers, agents, organizations, properties, and other information relevant to management of property tours. The property tour management server 150 may furthermore include an application programming interfaces (API) that enables it to interface with various in-home smart devices such as smart locks, smart thermostats, and smart lighting systems. An example embodiment of a property tour management server 150 is described in further detail below with respect to FIG. 2.

The clients 110, 120, 130 each comprise a computing device that interfaces with the property tour management server 150 to obtain inputs from users and to receive and display information received from the property tour management server 150. The agent client device 110, buyer client device 120, and administrator client device 130 are each configured for operation by a real estate agent, prospective property buyer, and administrator of a real estate organization respectively to enable access to relevant information and functions of the property tour management server 150. The client devices 110, 120, 130 may be configured such that the different entities (e.g., agent, buyer, and administrator) may have access to different information and functions that are not necessarily accessible to other entities. For example, the agent client device 110 may provide access to information relevant to multiple different buyers while the buyer client device 120 may enable access to information relevant only to that buyer. The administrator client device 130 may enable access to information relating to multiple agents affiliated with the organization.

In an embodiment, a client 110, 120, 130 may comprise, for example, a mobile device, a tablet, a laptop computer, a desktop computer, or other computing device capable of communicating and displaying information. The agent client device 110, buyer client device 120, and administrator client device 130 may each execute a browser or an application that interacts with the property tour management server 150 to facilitate the functions of the respective devices 110, 120, 130 described herein.

The property database 160 comprises a database of properties that is accessible over the network 140. The property database 160 includes properties available for sale, rent, or otherwise available for showing to an interested individual. For example, the property database 160 may comprise a multiple listing service (MLS) database or other property listing database utilized by real estate agents. The property database 160 stores profiles for various properties including information such as a property identifier, an address, relevant sales information (e.g., listing price, listing agent, etc.), and information about the property (e.g., size of property, size of structures, number of bedrooms, number of bathrooms, age of home, presence or absence of various features such as a pool, central air, gas appliances, etc.)

The location service 170 comprises one or more servers that provides location-based services over the network 140. For example, the location service 170 may include a maps service that can return a map in response to a query for a particular address or region. The location service 170 may also include a service for automatically generating directions between two or more addresses and may additionally estimate travel times between the addresses. The estimated travel time may be based on travel distance between the properties, and other factors such as real-time traffic, weather, road conditions, or other information. The location service 170 may provide location information in response to a query from the property tour management server 150 or a client device 110, 120, 130. The query may include, for example, global position system (GPS) coordinates corresponding to a sensed location of the client device 110, 120, 130 or a street address associated with a particular property.

Figure 2:
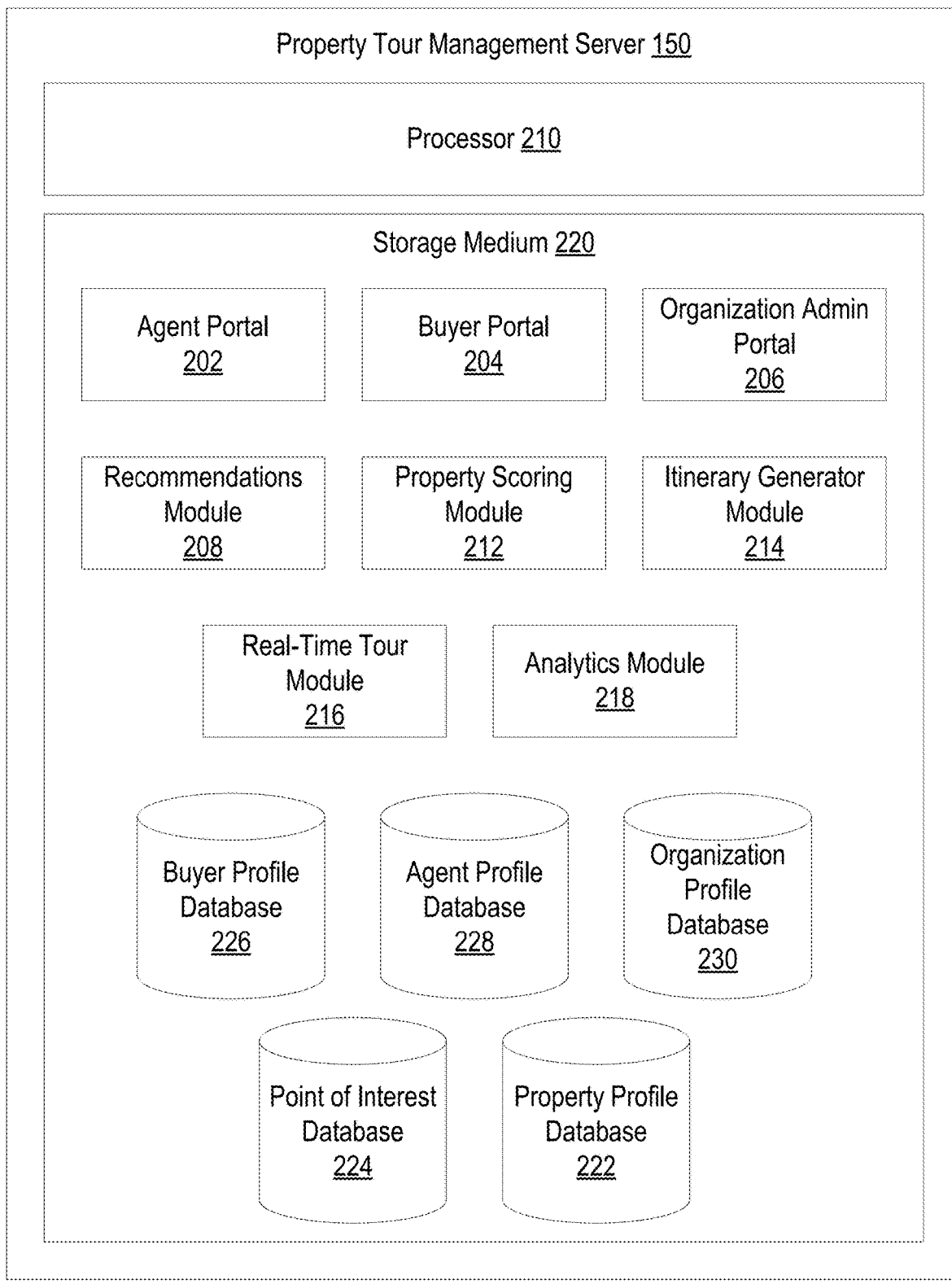
FIG. 2 illustrates an embodiment of a property tour management server, according to one embodiment.

FIG. 2 illustrates an embodiment of a property tour management server 150. The property tour management server 150 comprises a processor 210 and a storage medium 220 (e.g., a non-transitory computer-readable storage medium). The storage medium 220 stores a plurality of modules each comprising instructions that when executed by the processor 210 causes the processor to carry out the functions attributed to the modules as described herein. The storage medium 220 furthermore stores a plurality of databases each storing various data relevant to operation of the property tour management server 150. In alternative embodiments, additional or different modules and databases may be included or functionality may be distributed differently between the various modules and databases.

The property profile database 222 stores profiles associated with properties. Each property profile may include values for a plurality of fields representing characteristics of the property. For example, the property profile may store information such as a property identifier, an address, home size, property size, location, number of bedrooms, number of bathrooms, number of garages, age of home, renovation status, or whether or not the home has certain features such as a pool, central air/heat, sprinkler systems, or other features. The property profile may also include various scores associated with a property such as, for example, a "walk score" associated with a property representing a measure of the density of points of interest (e.g., restaurants, bars, theaters, stores, etc.) within walking distance of the property, a traffic score representing a measure of typical traffic in the vicinity of the property, and a crime score representing measure of criminal activity within a vicinity of the property. The property profile may furthermore include information about smart devices associated with the property and credentials and/or permissions for accessing the smart devices via an API of the property management server 150. At least some of the data in the property profiles may be obtained by the property management server 150 from the properties database 160. In an embodiment, instead of directly storing profiles in the property profile database 222, the property profile database 222 may instead store references to data in the external property database 160.

The points of interest (POIs) database 224 stores profiles associated with points of interest that may be relevant to property buyers. Here, a POI may represent, for example, a place of work, school, or worship, locations of businesses such as grocery stores, gyms, yoga studios, theaters, restaurants, etc., or other destinations such as parks and landmarks. The POI profiles may include a plurality of fields storing information such as a POI identifier, an address, a POI type, or other information relevant to property buyers.

The buyer profile database 226 stores profiles associated with potential buyers of properties. Each buyer profile may include values for a plurality of fields representing characteristics of the buyer and preferences associated with the buyer. For example, the buyer profile may store information such as the buyer's name (or family name), the buyer's current address, the buyer's preferences, and historical data associated with prior interactions of the buyer with the property tour management server. If the buyer is a family, the buyer profile may include sub-profiles for each family member including information such as name, age, gender, place of school or work, and relationship to other family members. The buyer's preferences may include a set of filters and/or priority scores representing an importance level associated with various property profile fields. For example, a particular buyer may have a buyer profile that filters properties to limit the properties of interest to a particular neighborhood, size, and price range and may exclude properties that lack certain desired features (e.g., a pool and central air). Priority scores may be used to indicate a relative desirability or undesirability of a particular characteristic. For example, a particular buyer profile may indicate that a pool is "very important," a three car garage is "somewhat important" and having more than four bedrooms is "not important." In different embodiments, different scoring systems may be employed that may have varying levels of granularity. For example, in one embodiment, each category may be scored on a scale of 1-10.

The agent profile database 228 stores account information for agents that may represent buyers or may otherwise assist buyers in a property tour experience. An agent profile may store identifying information for the agent and may store cross-references to properties associated with the agent (e.g., in the property profile database 224), buyers associated with the agent (e.g., in the buyer profile database 226), and administrators for organizations associated with the agent (e.g., in the organization account database 230).

The organization profile database 230 stores account information for organizations associated with the agents. The organization may represent, for example, a real estate franchise with which agents may be affiliated. The organization profile may store identifying information for the enterprise and may store cross-references to properties associated with the enterprise (e.g., in the property profile database 222), buyers associated with the organization (e.g., in the buyer profile database 226), and agents associated with the enterprise (e.g., in the agent profile database 228).

The agent portal 202 comprises an interface to enable an agent having a stored profile in the agent profile database 228 to access the property tour management server 150 and take various actions to facilitate a property tour. An agent may access the agent portal 202 via a web interface or mobile application using appropriate login credentials associated with an agent account. From the agent portal 202, the agent can add or modify buyers associated with the agent account. The agent can access a buyer's profiles and update various profile fields. The agent can also view prior interactions associated with the buyer such as information relating to prior property sales transacted by the agent on behalf of the buyer, prior home tours, or interactions by the buyer with the home tour management server (e.g., what properties the buyer viewed).

The agent portal 202 also enables the agent to search for properties and view property profiles associated with different properties. For example, in an embodiment, the agent can locate a particular property profile by inputting a property identifier (e.g., a multiple listing service (MLS) number), an address, or search criteria (e.g., home size, property size, location, or other features). The agent can select to associate a property with a particular buyer that the agent believes may be interested in the property. For example, the agent can select to add the property to an "of interest list" for the buyer or may add the property to a "home tour list" for the buyer. In an embodiment, the agent portal may provide automated recommendations to the agent suggesting particular properties that may be of interest to particular buyers.

The agent portal 202 may furthermore enable the agent to view points of interest in the points of interest database 224 that may be relevant to a particular buyer or a particular property and may enable the agent to associate one or more points of interest with a particular buyer profile or property. In one embodiment, points of interest may be automatically associated with properties (e.g., based on being within a threshold distance to the property). The agent portal 202 may furthermore enable the agent to view distances from each property to the relevant points of interest. Here, the distance may be expressed as, for example, a driving distance, a driving time in typical traffic, a walking distance, or a combination thereof.

The agent portal 202 enables the agent to select a control for generating a home tour itinerary targeted to a particular buyer. Here, the agent may input, for example, the identified buyer, a desired start time and date for the home tour, a starting location for the tour, and a set of properties to be included in the itinerary. The agent may furthermore provide input specifying if one or more breaks are desired and a length and/or location associated with any desired breaks. Optionally, the agent may input constraints on the property tour. For example, the agent may input if the property tour must be completed by a particular time, if there is any desired priority between the properties, or if certain properties must be shown during particular predefined time windows. The home tour management server 150 may then automatically generate an itinerary for the property tour (e.g., using the itinerary generator module 214) as described in further detail below. The itinerary may be presented to the agent via the agent portal 202 and may be manually updated by the agent to add or remove properties, change the scheduled time, or change the order. A process for automatically generating a property tour itinerary is described in further detail below with reference to FIG. 4.

In an embodiment, the agent portal 202 provides an interface for enabling the agent to capture a welcome video targeted to a particular buyer. For example, the home tour management server 150 may capture a video, store it in association with a particular agent and buyer, and cause the video to load upon the particular buyer accessing the home tour management server 150 via the buyer portal 204.

In an embodiment, the agent portal 202 may operate in a "tour mode" when a property tour is in progress. In an embodiment, the agent portal 202 automatically detects when a tour is progress based on the itinerary and time and/or location information. The agent portal 202 automatically configures the agent portal 202 in the tour mode responsive to the detection. In this mode, the agent is presented with an interface that enables the agent to follow along with the tour. For example, the interface may present a schedule associated with the itinerary. While on location at a particular property, the interface may be automatically updated to show information about the property being viewed together with pictures and/or video if available. In an embodiment, the agent may enter and stores notes associated with the property or may view property scores associated with the property entered by the buyer via the buyer portal 204 during the tour. The tour mode interface may also provide alerts to the agent to help the agent adhere to the itinerary schedule. For example, the agent may be alerted 10 minutes prior to being scheduled to move onto the next location.

The agent portal 202 may furthermore provide controls that enable the agent to access smart devices within a home being toured if permissions to access such devices are granted by the property owner. For example, the agent portal 202 may enable the agent to control smart locks, smart lighting systems, or smart thermostats via control interfaces on the agent portal 202.

The agent portal 202 may also enable the agent to access various analytics associated with prior interactions or prior property tours. The agent can view past activity of buyers, past tours conducted, and various statistics associated with property sales and tours.

The buyer portal 204 comprises an interface to enable a buyer having a profile in the buyer profile database 226 to access the property tour management server 150 and take various actions to facilitate a property tour. Through the buyer portal 204, the buyer may set up or modify a buyer profile including various information about the buyer and various preferences relating to properties as described above. In an embodiment, the buyer may manually populate the various fields of the buyer profile. Alternatively, the buyer may be presented with a series of questions and the property tour management server 150 may use the answers to the questions to automatically populate the buyer's profile. The buyer may access and view the welcome video set up by the agent via the buyer portal 204. The buyer may also browse properties, view recommendations, and update the list of properties presently associated with the buyer's profile. The buyer can also access and modify points of interest associated with the buyer or associated with properties of interest. The buyer can furthermore view a tour itinerary set up by an agent, request a new itinerary, or make (or request) changes to an existing itinerary.

In an embodiment, the buyer portal 204 includes control elements to enable a buyer to access a property profile and assign scores to the property in a number of different categories as the buyer accesses information, pictures, and videos about the property. The categories could include, for example, general categories such as location, size, curb appeal, interior style, and floorplan. In other embodiment, the categories may comprise specific rooms (e.g., kitchen, bedroom 1, bedroom 2, bathroom 1, bathroom 2 living room, dining room, etc.) to enable the buyer to provide room-by-room scores for a given property. In an embodiment where the buyer includes a family, different sets of scores may be provided by different family numbers. The scores in the different categories and from different family members may be combined to generate an overall score for each property. In an embodiment, a ranked list of properties may be presented to the buyer at least in part based on the overall scores.

In an embodiment, the buyer portal 204 may operate in a "tour mode" when a property tour is in progress. In an embodiment, the buyer portal 204 automatically detects when a tour is progress based on the itinerary and time and/or location information. The buyer portal 204 automatically configures the buyer portal 204 in the tour mode responsive to the detection. In this mode, the buyer is presented with an interface that enables the buyer to follow along with the tour. For example, the interface may present a schedule associated with the itinerary. While viewing a particular property, the interface may be automatically updated to show information about the property being viewed together with pictures and/or video if available. Interface controls may be presented to enable the buyer to submit or update scores associated with the property in real-time as the property is being toured.

The organization administrator portal 206 comprises an interface to enable an administrator of a real estate organization having an account in the organization profile database 230 to access various features of the property tour management server 150. For example, the administrator may gain access to reports and analytical data relating to the agents that are affiliated with the organization. For example, the administrator may be able to track sales results, data pertaining to properties tours, or other information relevant to the organization being able to evaluate and track agents.

The property scoring module 212 generates scores for properties based on how well the property profiles match the buyer's desired criteria and/or based on scores manually entered by the buyer. For example, in one embodiment, the property scoring module 212 may weigh the scores assigned in different categories by a weighting factor based on the importance level of the category assigned by the buyer. In the case that the buyer represents a family, scores from multiple family members may be combined (by computing an average or weighted average) to generate an overall score for the property. Properties may be ranked according to their scores.

The recommendations module 208 automatically identifies properties that may be of interest to a particular buyer. In an embodiment, the recommendations module 208 may perform a correlation between the buyer profiles and the property profiles to determine matching scores between the particularly property and the buyer's desired criteria. In an embodiment, the recommendations module 208 may communicate with an external server that provides a recommendations service. For example, the recommendations module 208 may communicate a buyer profile (or portion thereof) to the external server to obtain a list of properties that are likely to be of interest to the buyer.

In an embodiment, the recommendations module 208 may train a machine learned model to improve the recommendations generated by the recommendations module 208 based on scores provided by buyers. For example, the machine learned model may learn correlations between particular property profiles and the scores provided by buyers to learn what property characteristics are most likely to result in higher scores. Examples of machine learning models that may be used for this purpose include, for example, a convolutional neural network, a VGG neural network, a ResNet neural network, or an Inception V4 neural network. In other embodiments, other types of machine learning models and training methods may be used, examples of which include but are not limited to: stochastic gradient descent, transfer learning algorithms, learning rate annealing, cyclic learning rates, differential learning rates, regularization techniques such as batch normalization, ensembling neural networks, etc.

The itinerary generator module 214 may automatically generate a tour itinerary for a buyer and an agent. Here, the itinerary generator module 214 may automatically estimate the time for touring each property that has been added to the property tour and the driving time between the properties. The itinerary may furthermore be based on a desired start time, a desired starting location, a desired number, location, or length of breaks during the tour, or other manually specified constraints such as a prioritization between properties, a desired end time, or limitations on when certain properties are available for viewing. The home tour management server 150 may then automatically determine an order for viewing the properties and generate an itinerary that sets forth the times for viewing each property. The itinerary may be viewed by, and manually updated by either the buyer or the agent. An embodiment of a process for automatically generating a tour itinerary is described in further detail below with reference to FIG. 4.

In an embodiment, upon generating an itinerary, the itinerary generator module 214 may automatically send out appointment requests requesting the determined tour times to accounts associated with each of the respective properties via email, text message, or other messaging interface, or via a push notification to the agent portal 202. The accounts may comprise, for example, an account for the seller's agent and/or the property owner. In an embodiment, the account is selected based on showing instructions specified in the property profile. The requests may include a fillable form or other interface controls that enable the relevant account holders to easily confirm, decline, or propose a different time or range of times.

If natural language responses are received, the itinerary generator module 214 may utilize natural language processing to determine the substance of the response. If the itinerary generator module 214 receives responses declining the originally proposed time, the itinerary generator module 214 may store an additional constraint representing the unavailability of the property during that time, and then re-generate the tour itinerary based on the new constraint. The process may repeat until a valid itinerary is found that is agreed to by all parties. In some cases, the itinerary generator module 214 may determine to remove a particular property from the property tour if a solution meeting all constraints cannot be found.

In an embodiment, upon confirming an itinerary, the itinerary generator module 214 may generate notifications to accounts associated with each respective property requesting instructions for gaining access to the property. For example, in an embodiment, a message enables selection from a plurality of predefined options including, for example, (1) meet seller's agent or homeowner at property; (2) access property via a lockbox on the property using a provided code; or (3) access property via a smart lock. In the case, of enabling access via a smart lock, the itinerary generator module 214 may obtain permissions (e.g., a one-time code or other credentials) that enables access to the property only during a certain specified time window which may correspond to the scheduled tour time. If granted, the itinerary generator module 214 may store the real-time code together with the itinerary and the code may be utilized to automatically gain access to the property during the scheduled time. In other embodiments, the permissions may furthermore include permissions to access other smart devices on the property such as smart lighting systems and smart thermostats. The permissions may be automatically rescinded or caused to expire following the end of the scheduled tour time for the property to enhance security for the property owner.

The real-time tour module 216 interfaces with the buyer client and the agent client during a scheduled tour. The real-time tour module 216 presents an interface to both the buyer client and the agent client that enables the parties to follow along with the tour. In an embodiment, the real-time tour module 216 obtains location information from a location sensor (e.g., a global positioning system (GPS)) integrated with either the buyer device or the agent device. The location information may be used to identify when the parties are touring a particular property and may update interfaces on the respective clients to show information about the property and to provide controls to enable the buyer to enter scores for the property and for the agent to view the scores or enter additional information to be stored in association with the property profile. Furthermore, when traveling between properties, the respective portals may illustrate a map showing the current location, route to the destination, and estimated arrival time. The real-time tour module 216 may furthermore automatically update the itinerary if the schedule changes. For example, if a tour of a particular property overruns its allotted time, the remaining portion of the tour may be recalculated depending on availability, traffic conditions, or other factors to facilitate completion of the tour in an efficient manner.

The real-time tour module 216 may also update automatically to show POIs relevant to the buyer and the property and to show distances from the property to the POIs. For example, the interface may show a distance from the property to a buyer's work or school.

The real-time tour module 216 may also interface with a camera integrated with the buyer device or the agent device. Here, the buyer or agent may take pictures while on the tour and the pictures may be automatically uploaded to the property tour management server 150 and stored in association with the property for the buyer to view later.

The real-time tour module 216 may also collect various statistical information relating to the tours. For example, the real-time tour module 216 may utilize the location data to calculate the time spent in each property. This information may be stored as part of the property profile, the buyer profile, and the agent profile to enable the itinerary generator module 214 to more intelligently calculate tour times as will be described in further detail below.

The real-time tour module 216 may also automatically interact with smart devices on the property that have granted access permissions during the scheduled tour time. For example, the real-time tour module 216 may communicate automatically with smart secure access devices at the properties to gain access to the properties at the scheduled time. For example, the real-time tour module 216 may automatically supply a one-time access code received from the property owner upon generating the itinerary that provides access to the property during the scheduled time window. Beneficially, by enabling access to the property only during the agreed upon scheduled time window, security of the property can be better ensured and the logistics of gaining access the property can be applied seamlessly for all parties.

In further embodiments, the real-time tour module 216 may interface with smart devices on the property that have granted access permissions to automatically control smart lighting and/or smart thermostat systems. For example, the real-time tour module 216 may cause smart lighting systems on the property to turn on all of the lights when the tour of the property is beginning (or upon detecting access to the property based on smart lock controls, based on the scheduled start time for the tour, or based on sensing location of the buyer and/or agent approaching the property) and to automatically turn off all lights upon the buyer and/or agent leaving the property (e.g., based on detected exit of the property based on smart lock controls, based on the scheduled end time for the tour, or based on sensing the location of the buyer and/or agent leaving the property). Similarly, the real-time tour module 216 may cause a smart thermostat to automatically bring the property to a particular temperature when the tour of the property begins and to return the thermostat to an "away" or "vacation" setting when the property tour ends.

The analytics module 218 generates analytical data associated with property sales or property tours. For example, the analytics module 218 may generate information relating to sales trends for a particular agent, tours conducted by a particular agent, or average trends associated with all of the agents affiliated with a particular enterprise.

Figure 3:
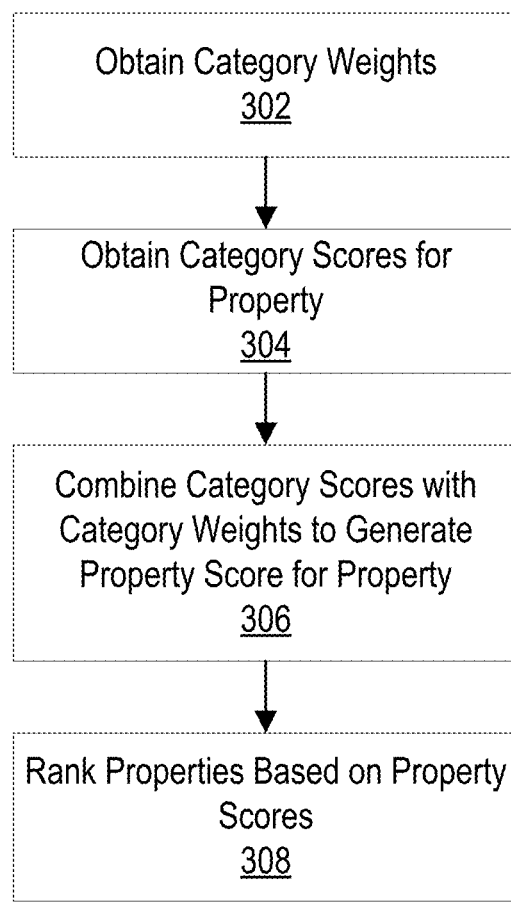
FIG. 3 is a flowchart illustrating an example method for generating property scores, according to one embodiment.

FIG. 3 illustrates an embodiment of a process for ranking properties of interest to a particular buyer. The property scoring module 212 obtains 302 category weights for a plurality of scoring categories. The property scoring module 212 also obtains 304 scores from the buyer in each category. In an embodiment, where the buyer is a family, multiple scores may be received for each category from different family members. The category scores and category weights are combined 306 to generate a property score for a property representing an estimated desirability of the property to the buyer. Properties are then ranked 308 based on their property scores. The property scores may be obtained from the buyer while the buyer is viewing the property profile online or through the real-time tour interface while the buyer is touring the property. In an embodiment, the property score may be generated based on a combination of scores manually received from the buyer and an automated score generating based on a correlation level between the buyer preferences specified in the buyer profile and the property profile.

Figure 4:
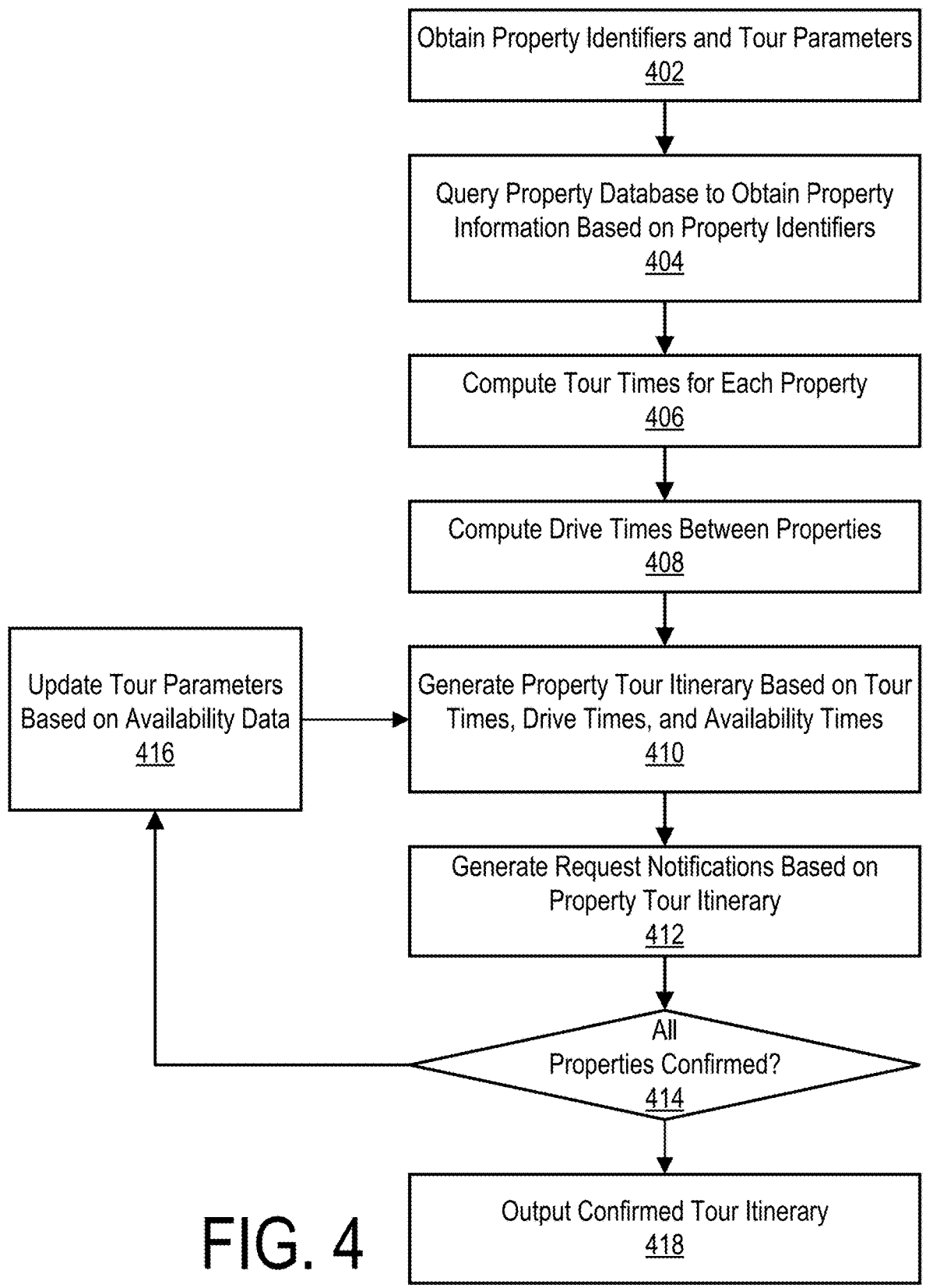
FIG. 4 is a flowchart illustrating an example method for generating a property tour itinerary, according to one embodiment.

FIG. 4 illustrates an embodiment of a process for automatically generating a property tour itinerary. The itinerary generator module 214 obtains 402 property identifiers and tour parameters for a set of properties to be included in the tour. The tour parameters may include, for example, a desired start time for the tour, a desired starting location for the tour, a desired end time for the tour, parameters for one or more desired breaks during the tour (e.g., length of break, time of break, location of break, etc.), prioritization of the properties included in the tour in the event that all properties cannot be viewed on the same day, any known time windows of availability or unavailability information for the properties, or other constraints that may be requested by the buyer or agent. In any embodiment, entry of at least some of the parameters is optional. Furthermore, in some embodiments, a prioritization level may be provided for different tour parameters to indicate the relative importance of the parameter being met. For example, the prioritization level may be selected from "required" (in which case the itinerary generator module 214 does not generate a tour that fails to meet the required parameter), "highly important" (in which case the itinerary generator module 214 applies a large penalty to a possible tour itinerary that does not meet the parameter), or "low importance" (in which case the itinerary generator module 214 applies only a small penalty to tour itineraries that do not meet the parameter). The property identifiers and tour parameters may be selected by the agent via the agent portal 202, by the buyer via the buyer portal 204, automatically based on the recommendations module 208 or by a combination thereof.

The itinerary generator module 214 queries 404 the property profile database 222 to obtain property profiles for each of the identified properties. For example, the property profile may include information for providing to via the buyer portal 204 and the agent portal 202 in association with the tour. Additionally, the property profile may include any pre-populated availability or unavailability data associated with the property.

An estimated tour time is computed 406 for each property based on the property profile, the buyer profile, or information manually provided when generating the tour itinerary. Here, the tour time may be based on various factors such as, for example, the size of the property, the buyer's score for the property, and historical data relating to prior tours of the property, prior tours by the buyer, and prior tours by the agent.

In an embodiment, the tour times may be derived from a machine-learning algorithm that learns correlations between tour times and various input factors to intelligently predict the tour time for a given property. For example, in an embodiment, the property tour management server 150 tracks tour times for each property toured using the property tour management system 100. Here, the tour time for a particular property may be identified based on a time when the tracked location of the buyer and/or agent substantially corresponds to the property location. Alternatively, a start time and end time for a tour of a particular property may be detected based on tracked entry and exit events associated with a smart lock system on the property. A supervised machine learning approach may then be employed in which the tracked tour times correspond to labels associated with respective feature vector derived from the buyer profile, property profile, and/or other input data. In an example embodiment, a neural network may be trained that learns correlations between the input feature vectors and their labels. For example, in one embodiment, a convolutional neural network is trained using transfer learning with fine tuning. In other embodiments, the neural network comprises a VGG neural network, a ResNet neural network, or an Inception V4 neural network. In other embodiments, other types of machine learning models and training methods may be used, examples of which include but are not limited to: stochastic gradient descent, transfer learning algorithms, learning rate annealing, cyclic learning rates, differential learning rates, regularization techniques such as batch normalization, ensembling neural networks, etc. The learned model can then predict a tour time associated with a particular buyer and property. Beneficially, as the number of tours tracked by the property tour management server 150 increase over time, the learned model may be continuously updated to further refine its predictions.

The itinerary generator module 214 also computes 408 the drive times between the properties. For example, in one embodiment, the itinerary generator module 214 may compute a distance matrix including distances between each property and each other properties. The distances may be obtained from, for example, the locations service 170 that communicates with the property tour management server 150 over the network 120. In an embodiment, the drive times may be obtained directly from the location service 170 instead of being computed locally.

An initial property tour itinerary is generated 410 based on the the calculated tour times, the drive times, and any manually provide tour parameters that constrain the tour itinerary. Here, the itinerary generator module 214 may generate an order for viewing the properties in a manner that minimizes the overall tour time. For example, the itinerary generator module 214 may initially solve an optimization problem that optimizes an order for viewing the properties in a manner that minimizes drive time while adhering to any required constraints given the estimated tour times. For other desired parameters that are not required, the itinerary generator module 214 may generate multiple candidate tour orders, compute the total driving time for the multiple candidate tour orders, determine start and end times for each property tour, and apply penalties to candidate tour itineraries that violate one or more of the desired parameters. The candidate tour with the lowest penalized drive time may then be selected. Examples of algorithms for optimizing a property tour order may be based on, for example, a vehicle routing problem (VRP) algorithm using combinatorial optimization. These algorithms may be based on, for example, vehicle flow formulation algorithms, commodity flow formulation algorithms, or set partition problems.

In some cases, a property tour cannot be generated that meets all of the required parameters. In this case, the itinerary generator module 214 may prompt the buyer and/or agent to either relax one of the required constraints or remove one of the properties from the itinerary in order to enable the itinerary generator module 214 to find a tour itinerary meeting all constraints. In one embodiment, the tour itinerary generator module 214 may intelligently identify one or more parameters to suggest relaxing or identify one or more properties to suggest dropping from the your that is likely to provide the most desirable tour itinerary for the buyer.

Once an initial tour itinerary is generated, the itinerary may be presented via the buyer portal 204 or agent portal 202 (or both) to enable the buyer or agent to manually adjust the automatically generated tour itinerary.

The itinerary generator module 214 generates 412 request notifications to determine if the properties are available for viewing during the generated itinerary times. Here, the itinerary generator module 214 may automatically generate push notifications to the seller's agent's web portal 202 or may generate email or text messages to the seller's agent requesting the selected times. The itinerary generator module 214 may monitor responses from the seller's agents to determine 414 if times for all of the properties can be confirmed. In an embodiment, the seller's agent may select from a set of possible responses that either confirm the proposed time, decline the proposed time without proposing a different time, or decline and propose a different time. In the case that a seller's agent declines a proposed time, the property profile associated with the property may be updated to indicate that the property is unavailable during that time window. In the case that the response proposes a different time, the proposed time may furthermore be stored in the property profile as a known available time for the property. if all property times cannot be confirmed in step 414 (i.e., because at least one seller's agent provides a response declining the proposed time), the parameters associated with generating the tour may be updated 416 based on the new availability data and the process may return to step 410 to re-compute the tour itinerary based on the updated parameters. Then, the itinerary generator module 214 may execute another iteration of the itinerary generation process using the additional availability or unavailability parameters. Otherwise, if all times are confirmed in step 414, the tour itinerary may be confirmed and the confirmed tour itinerary may be outputted 418 via the agent portal 202 and buyer portal 204.

In an embodiment, the itinerary generator module 214 may furthermore execute during a property tour to update the tour itinerary in real-time as various parameters change during a property tour. For example, if a tour of a property early in the tour itinerary runs longer than estimated, the itinerary associated with the remainder of the tour may be updated based on additional constraints associated with the compressed time schedule. Furthermore, if traffic data dictates a change in driving time that causes a different tour order to be preferable, the itinerary generator module 214 may automatically update the tour itinerary to present an optimized tour based on the updated conditions.

Figure 5:
FIG. 5 illustrates an opening dashboard of an agent portal according to one embodiment.
Figure 6:
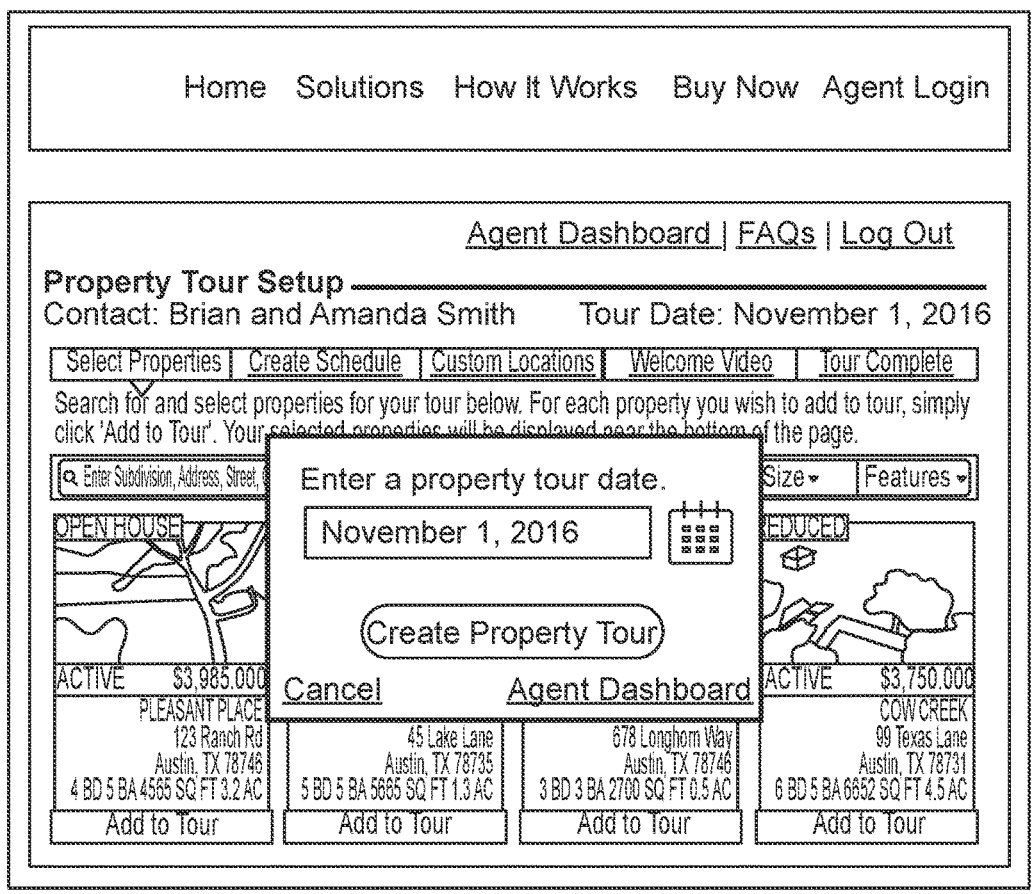
FIG. 6 illustrates an interface of an agent portal for creating a property tour according to one embodiment.
Figure 7:
FIG. 7 illustrates an interface of an agent portal for performing a property search according to one embodiment.
Figure 8:
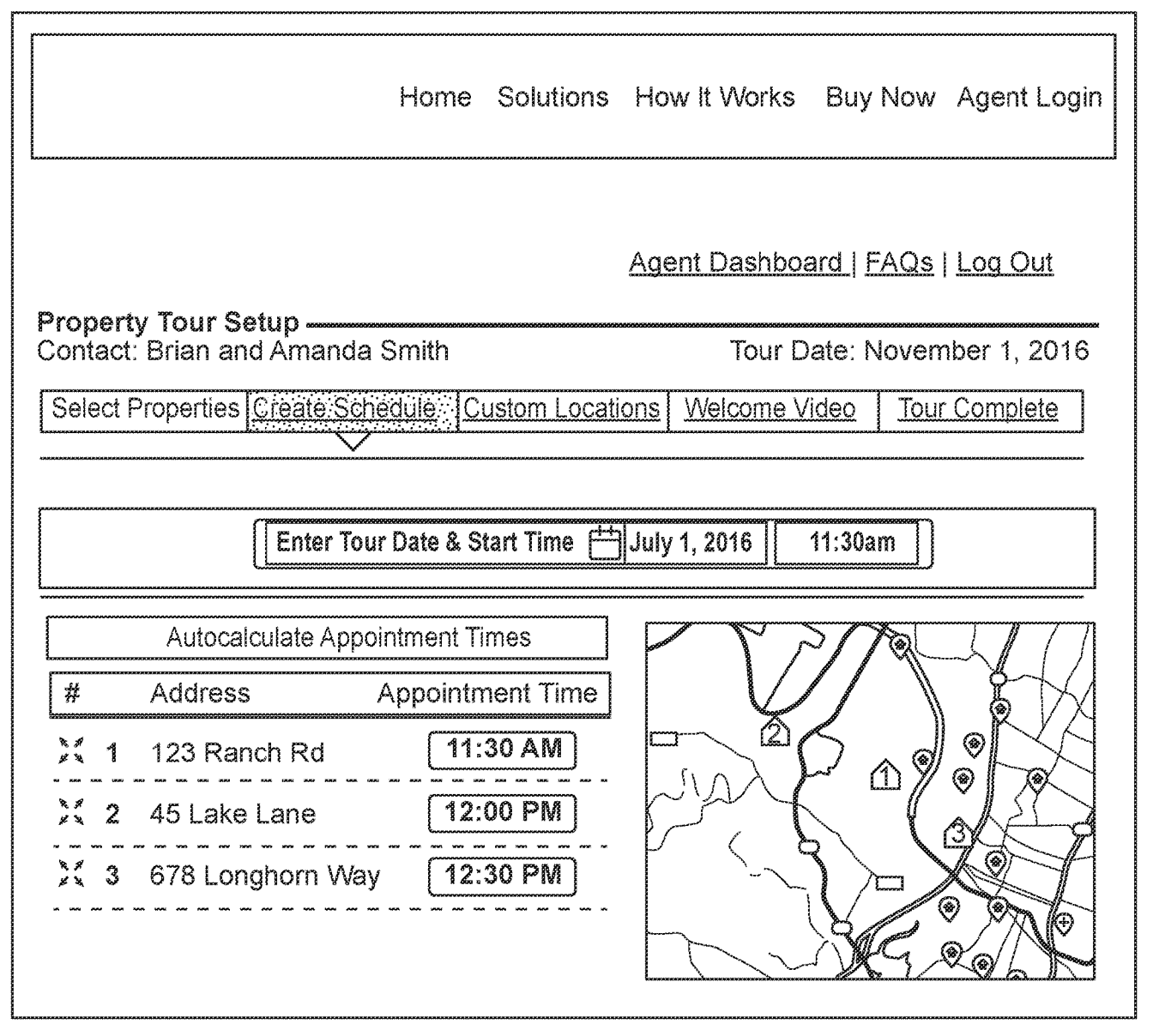
Figure 10:
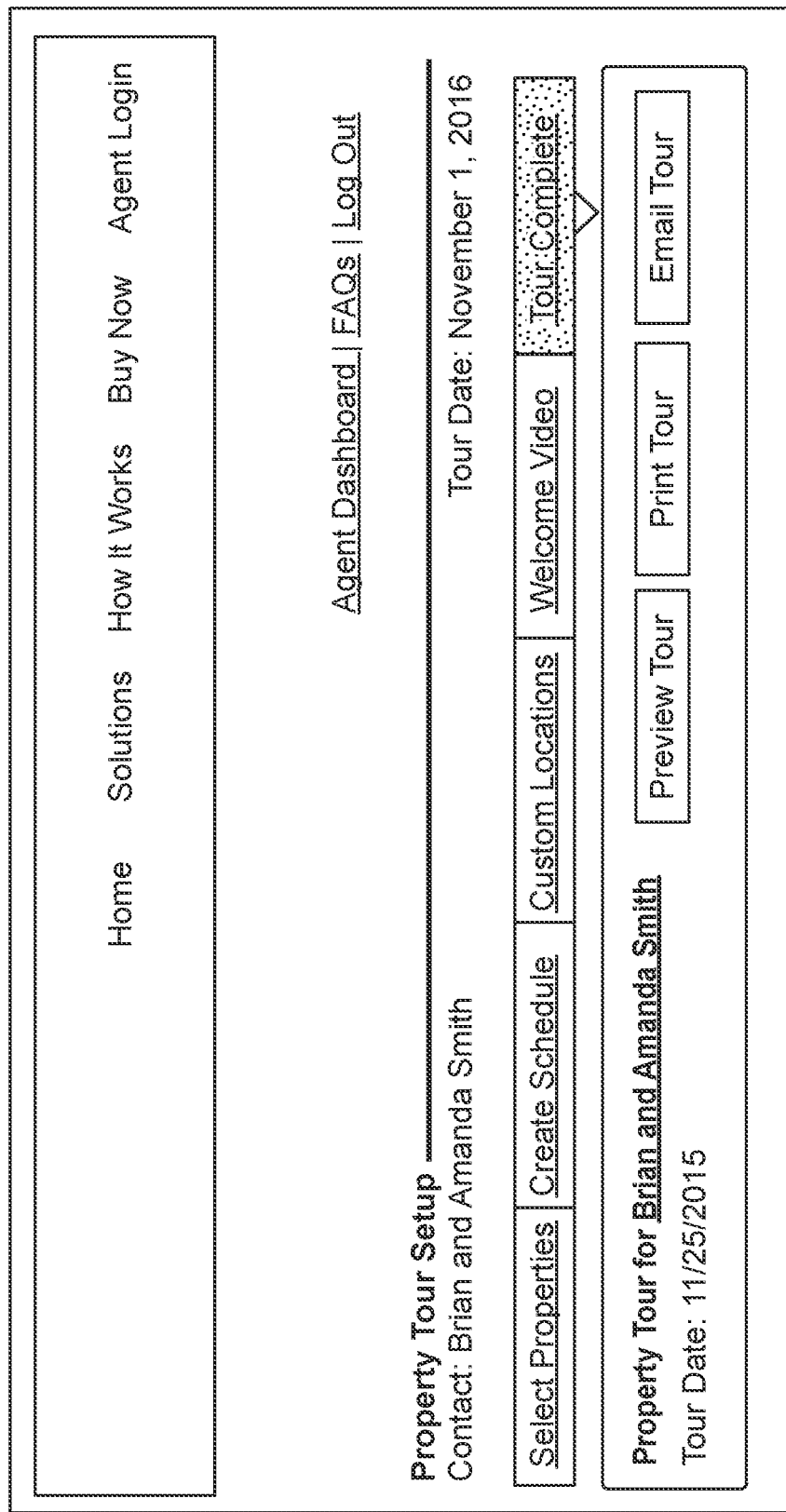
FIG. 10 illustrates an interface for previewing a property tour according to one embodiment.

FIGS. 5-10 illustrate an example sequence of interfaces that may be displayed via the agent portal 202 when the agent is creating a tour itinerary. FIG. 5 illustrates an opening dashboard of the agent portal 202. From this dashboard, an agent can initiate creation of a property tour by selecting the "Create a new Property Tour" button. Once the agent creates or selects a particular buyer for whom to create the property tour, the agent portal 202 presents an interface to enable the agent to select a date for the tour, as illustrated in FIG. 6. As illustrated in FIG. 7, the agent portal 202 may then present an interface that enables the agent to search for properties or enter a property identifier that can be assigned to the property tour. As illustrated in FIG. 8, the agent portal 202 presents an interface that enables the agent to automatically generate a tour itinerary and/or manually organize the properties associated with the property tour according to a particular tour order. FIG. 9 illustrates an embodiment of an interface presented via the agent portal 202 to enable the agent to select points of interest to be associated with the tour itinerary. Points of interest may be manually selected or may be automatically recommended. As illustrated in FIG. 10, the agent portal 202 then presents an interface that enables the agent to preview, email, or print the property tour itinerary.

Figure 11:
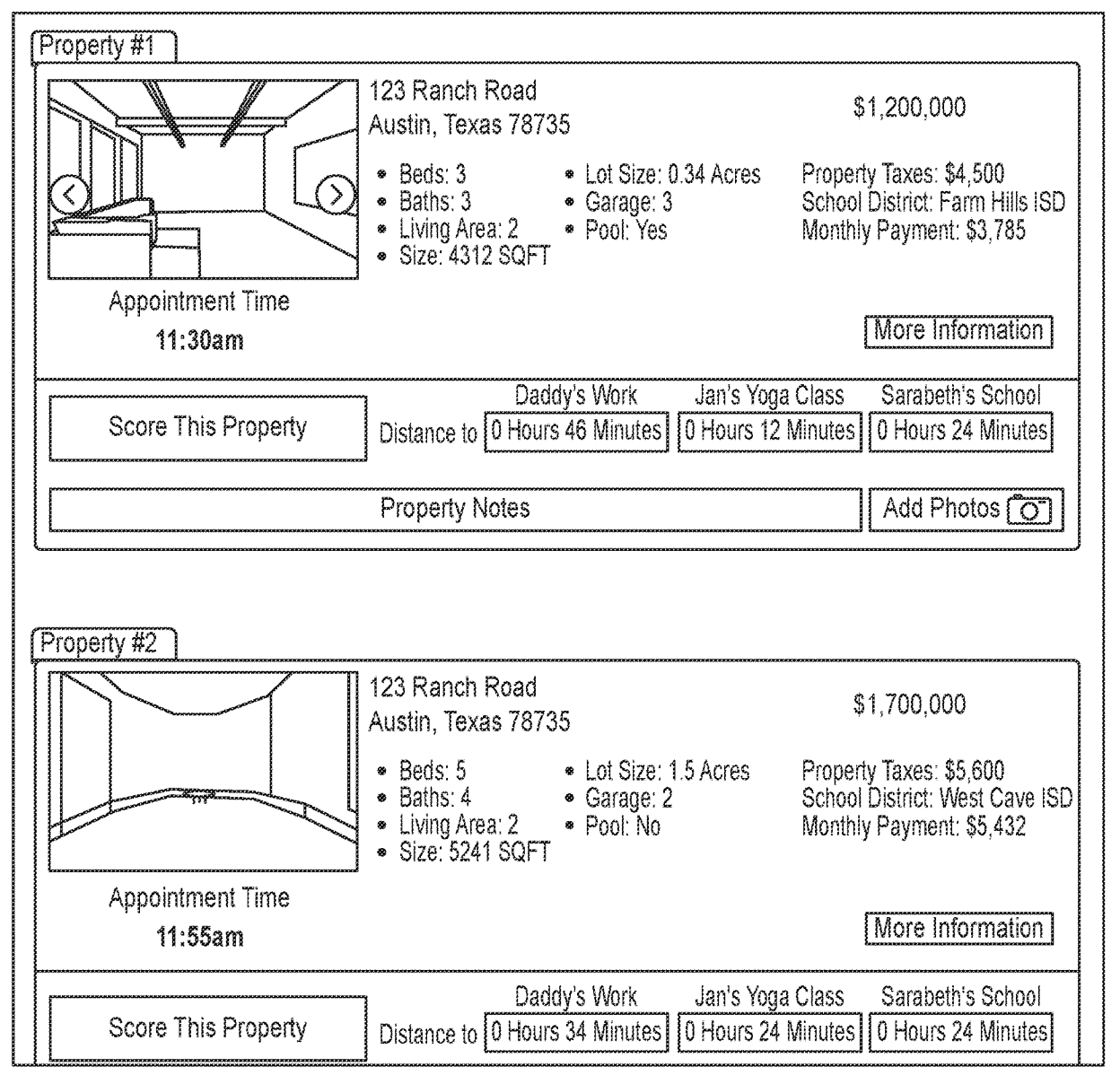
Figure 12:
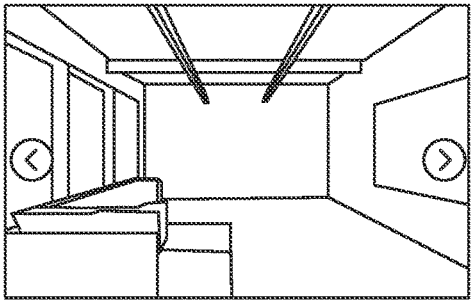
FIG. 12 illustrates an embodiment of a scoring interface for scoring aspects of a property according to one embodiment.

FIGS. 11-12 illustrate an example sequence of interfaces that may be displayed via the buyer portal 204 when the buyer is viewing a tour itinerary. As illustrated in FIG. 11, an interface presents information relating to a set of properties associated with the property tour. The interface includes controls to enable the buyer to document notes, take photos, and score properties based on their specific features. The interface also illustrates distances to various points of interest that may be automatically computed. As illustrated in FIG. 12, a scoring interface enables the buyer to enter scores in various categories associated with a particular property. An overall score for the property may be automatically computed and stored in association with the property.

Additional Considerations

In various alternative embodiments, the processes described in FIGS. 3 and 4 may be performed at least partially on one or more of the clients 110, 120, 130 instead of on the property tour management server 150. Furthermore, one or more of the modules and databases attributed to the property tour management server 150 in FIG. 2 may be partially or fully implemented on one of the client 110, 120, 130 or a different external server or device.

As used herein, a "buyer" may include an individual or entity seeking to purchase a property in cash or with financing, an individual or entity seeking to lease a property, or an individual otherwise having an interesting in touring a property. Furthermore, as used herein, a "seller" may include an individual or entity seeking to sell a property, a homeowner, an individual or entity seeking to lease a property, or an individual or entity otherwise having authority to show a property to an interested party. As used herein, an "agent" may include a licensed real estate agent, or other individual or entity authorized to take action on behalf of a buyer or seller. A "seller's agent" may also include the property owner or other individual acting as a representative for the property that is not necessarily a licensed real estate agent. A "buyer's agent" may also include the prospective buyer or other individual acting as a representative for the buyer that is not necessarily a licensed real estate agent.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by the one or more processors that are temporarily configured (e.g., by software or program code comprised of instructions) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for the embodiments herein through the disclosed principles herein. Thus, while particular embodiments and applications have been illustrated and described, it is to be understood that the disclosed embodiments are not limited to the precise construction and components disclosed herein. Various apparent modifications, changes, and variations may be made in the arrangement, operation and details of the method and apparatus disclosed herein without departing from the spirit and scope defined in the appended claims.

The invention claimed is:

1. A method for generating a property tour itinerary for a prospective buyer comprising:
   obtaining a plurality of property identifiers for a plurality of properties and constraints associated with the property tour itinerary;
   querying a property database to obtain property information associated with the plurality property identifiers;
   computing, by a processor, tour times for each of the plurality of properties based on the property information, wherein computing the tour times for a select property of the plurality of properties comprises:
      generating a first feature vector representing characteristics of the select property based on the property information, the characteristics of the select property including historical tour times for the select property tracked based on detected entry and exit events associated with the select property in prior tours;
      generating a second feature vector representing characteristics of the prospective buyer based on a buyer profile; and
      applying a machine-learned model to the first and second feature vectors to generate a predicted tour time associated with the select property, the machine-learned model trained based on characteristics of historical prospective buyers, characteristics of historical properties that have been toured, and observed tour times associated with the historical prospective buyers touring the historical properties;
   querying a maps database to determine estimated drive times between pairs of the plurality of properties based on the property information;
   generating a property tour itinerary based on at least the tour times, the drive times, and the constraints;
   outputting a representation of the property tour itinerary to a user interface of a client device;
   causing the client device to operate in a tour mode;
   when operating in the tour mode, detecting a start time associated with a tour of the select property in the property tour itinerary;
   obtaining credentials for accessing a smart lock device in the select property based on the property information;
   providing the credentials to the smart lock device via an application programming interface for the smart lock device;
   causing presentation of controls for controlling the smart lock device via a user interface of the client device;
   controlling the smart lock device in response to detecting selection of the controls;
   detecting an entry event associated with the select property based on an entry signal received over a network from the smart lock device associated with the select property;
   detecting an exit event associated with the select property based on an exit signal received over the network from the smart lock device associated with the select property; and
   updating the machine-learned model based on an observed tour time for the select property between the entry event and the exit event.

2. The method of claim 1, wherein generating the property tour itinerary comprises:

determining tour order for the plurality of properties that meets the constraints and an optimization criterion; and generating start times for each of the plurality of properties based on a desired tour start time, the determined tour order, and the tour times.

3. The method of claim 1, wherein generating the property tour itinerary comprises:

identifying accounts associated with the properties based on the property information;

automatically transmitting availability request messages to the accounts associated with the properties requesting availability information associated with the property tour itinerary;

receiving responses to the availability request messages;

responsive to at least one of the responses indicating unavailability of a given property at a scheduled time specified by the property tour itinerary, updating the constraints to generate updated constraints specifying the unavailability; and re-generating the property tour itinerary based on the updated constraints.

4. The method of claim 1, further comprising:

tracking a location of a client device associated with the property tour itinerary during a scheduled time of the property tour itinerary;

detecting an observed time difference of at least a threshold time difference between a scheduled time associated with a tour of a given property in the property tour itinerary and an actual time;

updating constraints associated with the property tour itinerary to reflect the observed time difference; and re-generating the property tour itinerary based on the updated constraints.

5. The method of claim 1, further comprising:

configuring the credentials to expire following an end time associated with the tour of the select property.

6. The method of claim 1, further comprising:

obtaining category weights for a plurality of scoring categories;

obtaining, for each of the plurality of properties, a set of category scores in each of the plurality of scoring categories;

combining, for each of the plurality of properties, the set of category scores with the respective category weights to generate property scores;

ranking the plurality of properties according to the property scores; and storing an association between the property scores and the plurality of properties in the property tour itinerary.

7. The method of claim 1, further comprising:

automatically causing a smart lighting system in the property to turn on lights in the select property upon detecting the entry event from the smart lock device; and automatically causing a smart lighting system in the property to turn off the lights in the select property upon detecting the exit event from the smart lock device.

8. A non-transitory computer-readable storage medium storing instructions for generating a property tour itinerary for a prospective buyer, the instructions when executed by a processor causing the processor to perform steps including:

obtaining a plurality of property identifiers for a plurality of properties and constraints associated with the property tour itinerary;

querying a property database to obtain property information associated with the plurality property identifiers;

computing, by a processor, tour times for each of the plurality of properties based on the property information, wherein computing the tour times for a select property of the plurality of properties comprises:

generating a first feature vector representing characteristics of the select property based on the property information, the characteristics of the select property including historical tour times for the select property tracked based on detected entry and exit events associated with the select property in prior tours;

generating a second feature vector representing characteristics of the prospective buyer based on a buyer profile; and applying a machine-learned model to the first and second feature vectors to generate a predicted tour time associated with the select property, the machine-learned model trained based on characteristics of historical prospective buyers, characteristics of historical properties that have been toured, and observed tour times associated with the historical prospective buyers touring the historical properties;

querying a maps database to determine estimated drive times between pairs of the plurality of properties based on the property information;

generating a property tour itinerary based on at least the tour times, the drive times, and the constraints;

outputting a representation of the property tour itinerary to a user interface of a client device;

causing the client device to operate in a tour mode;

when operating in the tour mode, detecting a start time associated with a tour of the select property in the property tour itinerary;

obtaining credentials for accessing a smart lock device in the select property based on the property information;

providing the credentials to the smart lock device via an application programming interface for the smart lock device;

causing presentation of controls for controlling the smart lock device via a user interface of the client device;

controlling the smart lock device in response to detecting selection of the controls;

detecting an entry event associated with the select property based on an entry signal received over a network from the smart lock device associated with the select property;

detecting an exit event associated with the select property based on an exit signal received over the network from the smart lock device associated with the select property; and updating the machine-learned model based on an observed tour time for the select property between the entry event and the exit event.

9. The non-transitory computer-readable storage medium of claim 8, wherein generating the property tour itinerary comprises:

determining a tour order for the plurality of properties that meets the constraints and an optimization criterion; and generating start times for each of the plurality of properties based on a desired tour start time, the determined tour order, and the tour times.

10. The non-transitory computer-readable storage medium of claim 8, wherein generating the property tour itinerary comprises:

identifying accounts associated with the property based on the property information;

automatically transmitting availability request messages to the accounts associated with the property requesting availability information associated with the property tour itinerary;
receiving responses to the availability request messages;
responsive to at least one of the responses indicating unavailability of a given property at a scheduled time specified by the property tour itinerary, updating the constraints to generate updated constraints specifying the unavailability; and
re-generating the property tour itinerary based on the updated constraints.

11. The non-transitory computer-readable storage medium of claim 8, the instructions when executed further causing the processor to perform steps including:
tracking a location of a client device associated with the property tour itinerary during a scheduled time of the property tour itinerary;
detecting an observed time difference of at least a threshold time difference between a scheduled time associated with a tour of a given property in the property tour itinerary and an actual time;
updating constraints associated with the property tour itinerary to reflect the observed time difference; and
re-generating the property tour itinerary based on the updated constraints.

12. The non-transitory computer-readable storage medium of claim 8,
the instructions when executed further causing the processor to perform steps including:
configuring the credentials to expire following an end time associated with the tour of the select property.

13. The non-transitory computer-readable storage medium of claim 8,
the instructions when executed further causing the processor to perform steps including:
obtaining category weights for a plurality of scoring categories;
obtaining, for each of the plurality of properties, a set of category scores in each of the plurality of scoring categories;
combining, for each of the plurality of properties, the set of category scores with the respective category weights to generate property scores;
ranking the plurality of properties according to the property scores; and
storing an association between the property scores and the plurality of properties in the property tour itinerary.

14. The non-transitory computer-readable storage medium of claim 8, wherein the instructions when executed further cause the processor to perform steps including:
automatically causing a smart lighting system in the property to turn on lights in the select property upon detecting the entry event from the smart lock device; and
automatically causing a smart lighting system in the property to turn off the lights in the select property upon detecting the exit event from the smart lock device.

15. A computing system for generating a property tour itinerary for a prospective buyer, the computing system comprising:
a processor; and
a non-transitory computer-readable storage medium storing instructions that when executed by the processor cause the processor to perform steps including:
obtaining a plurality of property identifiers for a plurality of properties and constraints associated with the property tour itinerary;
querying a property database to obtain property information associated with the plurality property identifiers;
computing, by a processor, tour times for each of the plurality of properties based on the property information, wherein computing the tour times for a select property of the plurality of properties comprises:
generating a first feature vector representing characteristics of the select property based on the property information, the characteristics of the select property including historical tour times for the select property tracked based on detected entry and exit events associated with the select property in prior tours;
generating a second feature vector representing characteristics of the prospective buyer based on a buyer profile; and
applying a machine-learned model to the first and second feature vectors to generate a predicted tour time associated with the select property, the machine-learned model trained based on characteristics of historical prospective buyers, characteristics of historical properties that have been toured, and observed tour times associated with the historical prospective buyers touring the historical properties;
querying a maps database to determine estimated drive times between pairs of the plurality of properties based on the property information;
generating a property tour itinerary based on at least the tour times, the drive times, and the constraints;
outputting a representation of the property tour itinerary to a user interface of a client device;
causing the client device to operate in a tour mode;
when operating in the tour mode, detecting a start time associated with a tour of the select property in the property tour itinerary;
obtaining credentials for accessing a smart lock device in the select property based on the property information;
providing the credentials to the smart lock device via an application programming interface for the smart lock device;
causing presentation of controls for controlling the smart lock device via a user interface of the client device;
controlling the smart lock device in response to detecting selection of the controls;
detecting an entry event associated with the select property based on an entry signal received over a network from the smart lock device associated with the select property;
detecting an exit event associated with the select property based on an exit signal received over the network from the smart lock device associated with the select property; and
updating the machine-learned model based on an observed tour time for the select property between the entry event and the exit event.

16. The computer system of claim 15, the instructions when executed further causing the processor to perform steps including:

obtaining category weights for a plurality of scoring categories;

obtaining, for each of the plurality of properties, a set of category scores in each of the plurality of scoring categories;

combining, for each of the plurality of properties, the set of category scores with the respective category weights to generate property scores;

ranking the plurality of properties according to the property scores; and storing an association between the property scores and the plurality of properties in the property tour itinerary.

17. The computer system of claim 15, wherein the instructions when executed further cause the processor to perform steps including:

automatically causing a smart lighting system in the property to turn on lights in the select property upon detecting the entry event from the smart lock device; and automatically causing a smart lighting system in the property to turn off the lights in the select property upon detecting the exit event from the smart lock device.

\* \* \* \* \*